United States Patent [19]

Hölzle et al.

[11] Patent Number: 5,995,754
[45] Date of Patent: Nov. 30, 1999

[54] METHOD AND APPARATUS FOR DYNAMICALLY OPTIMIZING BYTE-CODED PROGRAMS

[75] Inventors: Urs Hölzle, Goleta; Robert Griesemer, Menlo Park; David Griswold, Woodside, all of Calif.

[73] Assignee: Sun Microsystems, Inc., Palo Alto, Calif.

[21] Appl. No.: 08/944,334

[22] Filed: Oct. 6, 1997

[51] Int. Cl.$^6$ ...................................................... G06F 9/45
[52] U.S. Cl. ........................... 395/709; 395/705; 395/704
[58] Field of Search .................................. 395/709, 705, 395/704; 709/103, 107

[56] References Cited

U.S. PATENT DOCUMENTS

| | | | |
|---|---|---|---|
| 4,658,351 | 4/1987 | Teng | 709/103 |
| 5,586,328 | 12/1996 | Caron et al. | 395/705 |
| 5,694,603 | 12/1997 | Reiffin | 709/107 |

OTHER PUBLICATIONS

Holzle, Urs and Ungar, David, A Third–Generation SELF Implementation: Reconciling Responsiveness with Performance, OOPSLA and ACM, Oct. 1994.

Holzle, Urs and Ungar, David, Optimizing Dynamically–Dispatched Calls with Run–Time Type Feedback, SIGPLAN and ACM, Jun. 1994.

Holzle, Urs —Chambers, Craig —Ungar, David, Debugging Optimized Code with Dynamic Deoptimization, ACM SIGPLAN 92, Jun. 1992.

Holzle, Urs and Ungar, David, Reconciling Responsiveness with Performance in Pure Object–Oriented Languages, ACM Transactions on Programming Languages and Systems, vol. 18, No. 4, pp. 355–400, Jul. 1996.

*Primary Examiner*—Tariq R. Hafiz
*Assistant Examiner*—Antony Nguyen-Ba
*Attorney, Agent, or Firm*—Beyer & Weaver, LLP

[57] ABSTRACT

Methods and apparatus for dynamically determining whether portions of code should be interpreted or compiled in order to optimize a software application during run-time are disclosed. According to one aspect of the present invention, computer-implemented method for run-time processing of a computer program which includes byte-codes arranged as a plurality of methods includes invoking a first method selected from the plurality of methods. Invoking the first selected method involves interpreting the first selected method. An invocation tracker which is arranged to track the number of invocations of the first selected method is updated, and a determination is made regarding when the invocation tracker indicates that the number of invocations of the first selected method exceeds a threshold value. The first selected method is compiled when it is determined that the invocation tracker indicates that the number of invocations of the first selected method exceeds a threshold value. This threshold value is periodically adjusted to keep the compilation and the interpretation overheads within acceptable ranges.

33 Claims, 11 Drawing Sheets

METHOD AND APPARATUS FOR DYNAMICALLY OPTIMIZING BYTE-CODED PROGRAMS

CROSS REFERENCE TO RELATED APPLICATIONS

This application is related to U.S. patent application Ser. No. 08/944,332, entitled "Inline Database for Receiver Types in Object-Oriented Systems," U.S. patent application Ser. No. 08/944,735, entitled "Method and Apparatus for Performing Byte-Code Optimization During Pauses, U.S. patent application Ser. No. 08/944,335, entitled "Mixed Execution Stack and Exception Handling," U.S. patent application Ser. No. 08/944,326, entitled "Method and Apparatus for Implementing Multiple Return Sites," U.S. patent application Ser. No. 08/944,331, entitled "Site Specific Message Dispatch in Object-Oriented Systems," U.S. patent application Ser. No. 08/944,330, entitled "Method and Apparatus for Dynamically Optimizing Compiled Activations," all filed concurrently herewith, U.S. patent application Ser. No. 08/884,856, entitled "Interpreting Functions Utilizing a Hybrid of Virtual and Native Machine Instructions," filed Jun. 30, 1997, and U.S. patent application Ser. No. 08/885,008, entitled "Interpreter Generation and Implementation Utilizing Interpreter States and Register Caching," filed Jun. 30, 1997, which are all incorporated herein by reference for all purposes in their entirety.

BACKGROUND OF THE INVENTION

1. Field of Invention

The present invention relates generally to methods and apparatus for optimizing the execution of software applications. More particularly, the present invention relates to methods and apparatus for dynamically determining whether portions of code should be interpreted or compiled in order to optimize a software application during run-time.

2. Description of the Relevant Art

The use of computer systems which share resources across a network of computer systems, e.g., local area networks, intranets and internets, is increasing. Accordingly, software applications, or computer programs, may be delivered in different formats to different computer systems, due to the fact that a particular computer system generally requires software applications to be in a format that is specific to that particular computer system. Alternatively, the computer programs may be delivered to a computer system in a machine-independent form, i.e., as byte codes, in order to enable one form of a computer program to be utilized by many different computer systems.

When computer programs are delivered in a machine independent form, the programs may be interpreted directly, or the programs may be translated into machine-dependent code, ie., "machine code." Programs which are interpreted directly occupy less space in a computer system than programs which are translated into machine code. However, programs which are interpreted directly have slower execution speeds than programs which are translated into machine code, in most cases. As such, the determination of whether or not to interpret a computer program directly, in lieu of translating the computer program into machine code, is often based on the relative importance of space in relation to execution speed.

As mentioned above, computer programs may be delivered as byte codes to a computer system. Computer systems which receive byte codes generally include compilers which are used to compile byte codes at run-time. Compiling byte codes at run-time entails translating the byte codes into machine code. FIG. 1a is a block diagram representation of a computer system with a byte code compiler. Byte codes 104, which may be arranged as a computer program, are delivered, or otherwise provided, to a computer system 105. Byte codes 104 may generally be provided by a variety of different sources. When byte codes 104, are executed, byte codes 104 are compiled using a compiler 106 at run-time. Compiled code 108, which is produced by compiler 106, is generally machine-dependent code that is specific to, and may be executed within, system 105. That is, compiler 106 translates byte codes 104 into compiled code 108 at run-time.

Some computer systems enable portions of previously compiled code to be "re-compiled" into more efficiently executed forms when those portions of previously compiled code are found to be executed repeatedly. In other words, a second, more costly, compilation process may be used to compile repeatedly invoked, previously compiled code to allow for more efficient execution of the repeatedly invoked code. FIG. 1b is a block diagram representation of a computer system with uses two compilation processes. A computer system 115 includes a first compiler 116 and a second compiler 122. Byte codes 114 are provided to computer system 115 for execution. At run-time, first compiler 116 translates byte codes 114 into machine-dependent compiled code 118, or machine code.

Machine-dependent compiled code 118 is executed, and different methods contained within machine-dependent compiled code 118 are tracked to determine when methods which are most often invoked are to be compiled with second compiler 122. When highly, or repeatedly, executed compiled code 120 is identified, the highly executed compiled code 120 is re-compiled in order to increase the overall execution speed of a computer program. As such, second compiler 122 translates highly executed compiled code 120 into re-compiled highly executed code 124.

Second compiler 122 is often a slower compiler than first compiler 116, although code compiled using second compiler 122 typically executes more efficiently than code compiled using first compiler 116. Therefore, the determination of when to re-compile highly executed compiled code 120 generally involves a trade-off between additional compilation overhead, with respect to overall run-time, and the improved efficiency afforded by re-compiled highly executed code 124.

One system which allows previously compiled code to be re-compiled for increased efficiency is the Self system, developed by Urs Hölzle and David Unger at Sun Microsystems, Inc. of Palo Alto, Calif. In the Self system, the determination of whether to re-compile previously compiled code is made based on how many times a specific portion of compiled code, such as a method, has been called. If the method has been invoked more times than a fixed limiting value, then the method is re-compiled. The fixed limiting value is essentially a fixed threshold, which reflects the number of times the method is to be invoked before the method is re-compiled to increase efficiency in execution.

Significant compilation overhead is often added to the overall execution of a program when a compiler is used to translate byte codes into machine-dependent code at run-time. As such, although machine code may execute much faster than interpreted code, always compiling all parts of a program into machine code prior to executing the machine code may not be desirable if the increased execution speed does not compensate for the overhead associated with compiling the program. In other words, a program may execute more quickly as interpreted code in the event that the amount of time spent compiling the program is not recovered during the execution of the program.

In a system such as the Self system, although re-compiling routines in a compiled program may serve to enable the program to execute more efficiently, the use of a fixed limit to determine when a routine should be recompiled may instead result in an inefficient, e.g., non-optimal, execution. By way of example, if the fixed limit is set such that substantially every routine in a program is re-compiled, then the increased execution speed gained with the re-compilation may not compensate for the compilation overhead associated with the re-compilation.

Therefore, what is needed is a method for efficiently executing programs in byte code format. More specifically, what is desired is a method for dynamically determining when portions of a computer program should be interpreted, and when portions of the computer program should be translated into machine code, to thereby ensure an efficient execution of the computer program.

SUMMARY OF THE INVENTION

Methods and apparatus for dynamically determining whether portions of byte code should be interpreted or compiled in order to optimize a software application during run-time are disclosed. According to one aspect of the present invention, when a selected method is invoked, it is initially interpreted. An invocation tracker tracks the number of invocations of the selected method. When the number of invocations of the selected method exceeds a threshold value, the method is compiled. By independently tracking the usage of various methods or other code segments, a more intelligent decision can be made as to which methods should be compiled, and which methods should remain interpreted. In some embodiments, a single threshold value may be used for all of the methods. In other embodiments, a plurality of threshold values may be used, with each threshold value being associated with one or more methods. With the later arrangement, the threshold values associated with different methods may be varied.

In one embodiment, the a compilation overhead associated with compiling the selected method is measured and the threshold value is adjusted accordingly when it is determined that the compilation overhead is not within the acceptable range. In another embodiment, the number of invocations of the compiled method is also tracked and is used to determine if and when recompilation is appropriate.

In another aspect of the present invention, the overhead associated with compiling a particular method is measured. The overhead is then compared to acceptable overhead parameters and if the overhead is not within an acceptable range, a threshold value that triggers the compilation of that particular method is adjusted. This aspect of the invention may be applied to the initial compilation of the method and/or a recompilation of the method.

According to still another aspect of the present invention, a computer system for executing byte codes arranged as a plurality of methods includes an interpreter suitable for interpreting various methods, and a tracking mechanism which counts interpretations of a selected method. The tracking mechanism is used to determine when the selected method is suitable for compilation. The computer system further includes a compiler suitable for compiling various methods. In one embodiment, the computer system includes a threshold adjusting mechanism which cooperates with the tracking mechanism to determine when the selected method is suitable for compilation. In another embodiment, the computer system further includes another tracking mechanism which count invocations of the selected method after it has been compiled, and is used in determining when the selected method is suitable for recompilation.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

When byte-coded computer programs are provided to a computer system, the programs may be interpreted directly, or the programs may translated into machine code at run-time for execution. Programs which are interpreted directly generally occupy less computer memory than programs which are translated into machine code. On the other hand, programs which are translated into machine code typically execute faster than programs which are interpreted directly. However, in some cases, the compilation overhead which is added to the overall run-time of a program when a compiler is used to generate machine code is not always recovered during the execution of the program. In these cases, interpreting the program directly may prove to be faster and more efficient. In general, the determination of whether a program would be more efficiently executed if interpreted directly or if translated into machine code is difficult. As such, programs are often not executed in the fastest, or most efficient, manner possible.

Allowing a byte-coded computer program to be both interpreted directly and translated into machine code increases the execution speed of the computer program over the execution speed that is attainable by a purely interpreted program. Mixing interpreted and machine, e.g., compiled, code also significantly reduces memory requirements associated with the execution of machine code alone. As such, mixing interpreted code and compiled code increases the efficiency of program execution.

Each method in a byte-coded program may be monitored to determine whether compiling the method would be beneficial to the overall execution of the program. In one embodiment, monitoring a method involves tracking the number of times the method is invoked as an interpreted method. When the invocations of the interpreted method reach a level, or threshold, which indicates that the method is likely to recover compilation costs if compiled, then the method is dynamically compiled. In order to essentially ensure that the compilation overhead associated with compiling methods in the program is maintained at an acceptable level, both the compilation overhead and the interpretation overhead of the program are monitored. When the compilation overhead is considered to be too high, then adjustments may be made to reduce the number of methods which are compiled, thereby lowering the compilation overhead. The adjustments that are made may include raising the threshold which is used in the determination of when an interpreted method is to be compiled. By allowing the adaptive threshold to be modified, the execution of byte-coded programs may be substantially optimized. In other words, the mixture of interpreted code and dynamically compiled code may be adjusted to achieve a smaller execution time and a better balance between the amount of memory space occupied by the program and the execution speed of the program.

Figure 1A:
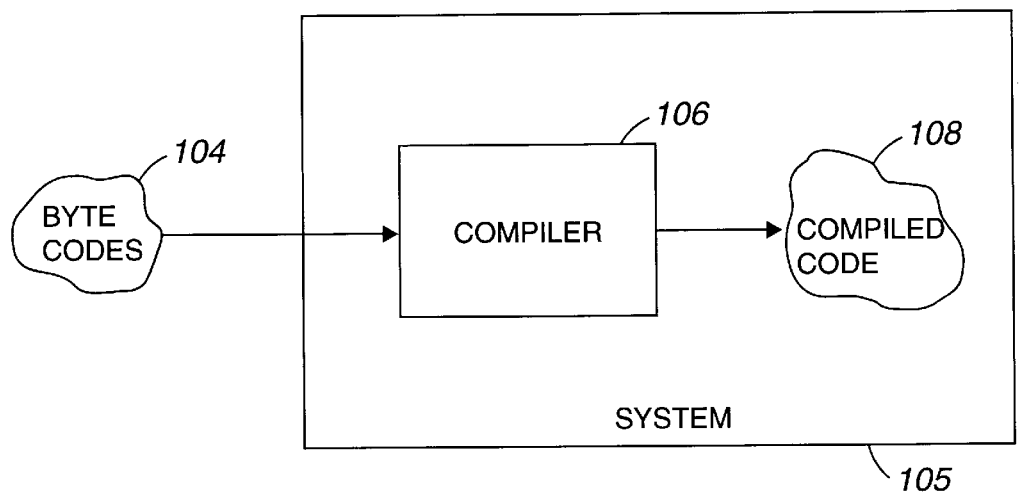
FIG. 1a is a block diagram representation of a computer system with a byte code compiler.
Figure 1B:
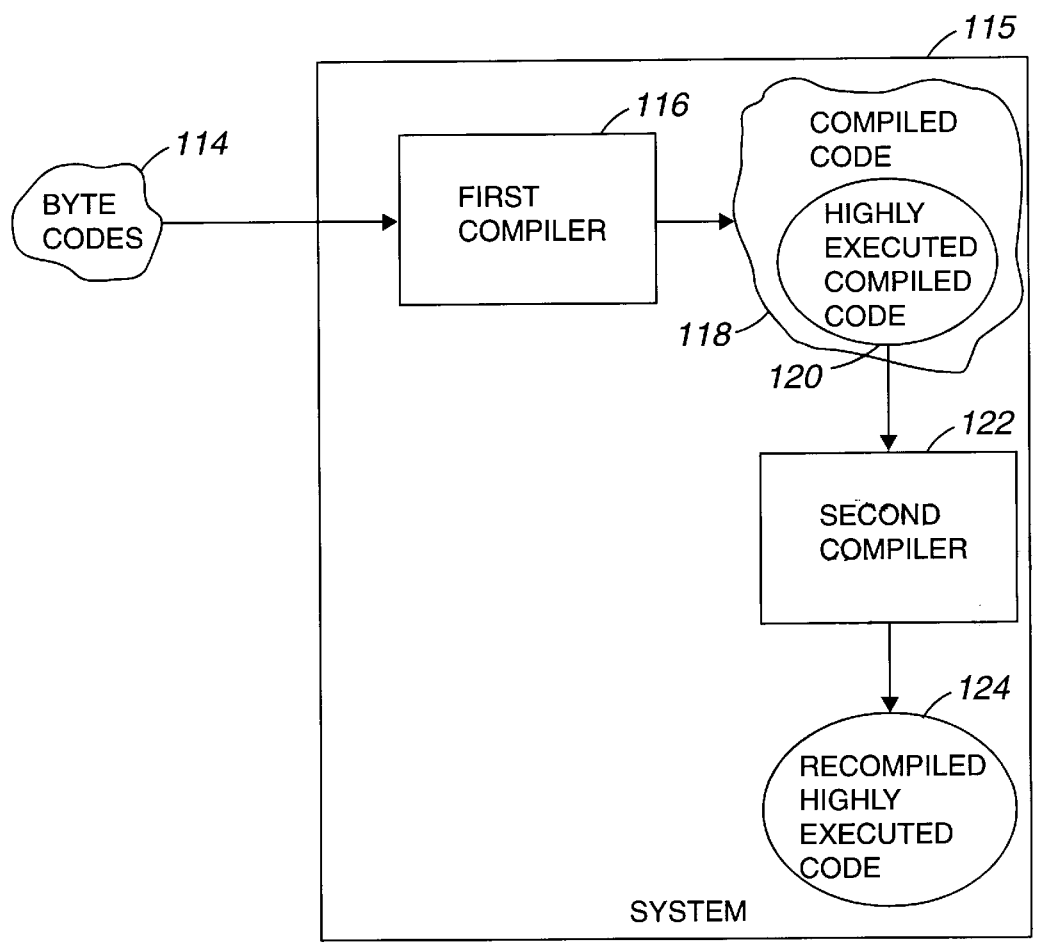
FIG. 1b is a block diagram representation of a computer system with uses two compilation processes.
Figure 2A:
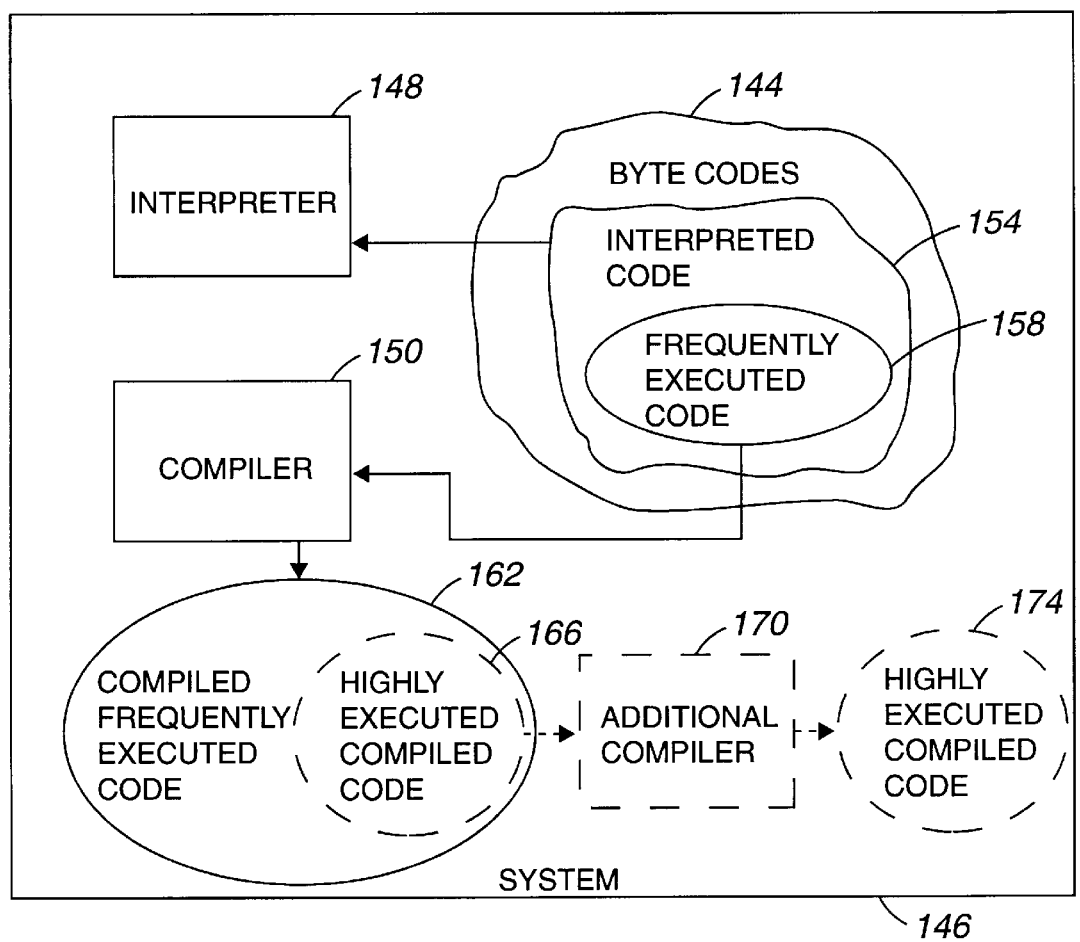
FIG. 2a is a block diagram representation of a computer system which dynamically compiles code in accordance with an embodiment of the present invention.

With reference to FIG. 2a, a computer system which uses adaptive thresholds to determine when byte codes should be dynamically compiled will be described in accordance with an embodiment of the present invention. Byte codes 144 are provided as input to a computer system 146 at run-time. Byte codes 144, which may be organized as a machine-independent computer program, are typically arranged as methods, or routines. In one embodiment, byte codes 144 may be provided by a compile-time environment within a virtual machine to a run-time environment, e.g., computer system 146, within the same virtual machine. One suitable virtual machine on which the present invention may be implemented will be discussed below in more detail with respect to FIG. 11.

When byte codes 144 are provided to computer system 146, byte codes 144 may be processed with an interpreter 148. Alternatively, byte codes 144 may be compiled by a compiler 150 to produce compiled code. Although byte codes 144 may generally be inputted substantially directly to both interpreter 148 and compiler 150, in the described embodiment, byte codes 144 are provided only to interpreter 148 for processing. The steps associated with processing byte codes 144 will be discussed below with respect to FIG. 2b.

Each time a method is invoked, byte codes 144 associated with the method are interpreted using interpreter 148. In the described embodiment, a measure of how many times a method is interpreted is maintained. Any suitable measure may be used to track how many times a method is interpreted. Suitable measures include, but are not limited to, a counter which is used to count the number of times a method is interpreted. Such a counter may be implemented within a method such that the counter is incremented each time the method is interpreted.

When the number of times a method is interpreted exceeds a threshold, i.e., a limiting value, the method may be compiled using compiler 150. Repeatedly interpreting a method, which is included in frequently executed code 158, may be inefficient, as interpreted byte code 154 generally executes slower, or less efficiently, than compiled code. Compiling frequently executed code 158 generally may allow methods embodied in frequently executed code 158 to be executed more efficiently, as time-savings gained by compiling the method is likely to compensate for the compilation overhead associated with the compilation process.

In general, during the execution of most computer programs, some methods are repeatedly executed, while others are executed infrequently. Frequently executed code 158 may generally be identified as sections of code which contain methods that account for a significant portion of the execution of the program. When frequently executed code 158 is compiled by compiler 150, a compiled version of frequently executed code 162 is produced. Therefore, when methods contained within compiled frequently executed code 162 are invoked, the compiled methods are invoked. In one embodiment, frequently executed code 158 includes a group of methods that accounts for substantially more than fifty percent of the overall execution time, e.g., approximately ninety percent of the overall execution time.

Some computer systems may include a single level of compilation, while other computer systems may include multiple levels of compilation. A computer system which includes multiple levels of compilation may be arranged to recompile compiled methods when it is determined that recompiling the methods may increase the execution efficiency associated with the methods. By way of example, a first level of compilation, which may be accomplished using compiler 150, may be associated with an "intermediate" level of compilation. An intermediate level of compilation may be arranged to compile byte codes into a compiled form which, while more efficient than interpreting the byte codes, may not be as efficient as a "final" level of compilation. The intermediate level of compilation may essentially sacrifice some execution efficiency associated with executing intermediately compiled methods for compilation speed, while the final level of compilation may be associated with longer compilation times, but more efficient execution.

In one embodiment, tracking mechanisms may be used to identify methods included in compiled frequently executed code 162 which are most often executed. In other words, within compiled frequently executed code 162, highly executed compiled code 166 may be identified. When the number of times a method within highly executed compiled code 166 is executed exceeds a threshold, highly executed compiled code 166 may be recompiled using an additional compiler 170 to produce a recompiled version of highly executed code 174. It should be appreciated that additional compiler 170 may be a different compiler than compiler 150. Alternatively, compiler 170 and compiler 150 may be substantially the same compiler implemented with different compiler parameters. It should be appreciated that although only two levels of compilation have been described, system 146 may generally include any number of levels of compilation.

Figure 2B:
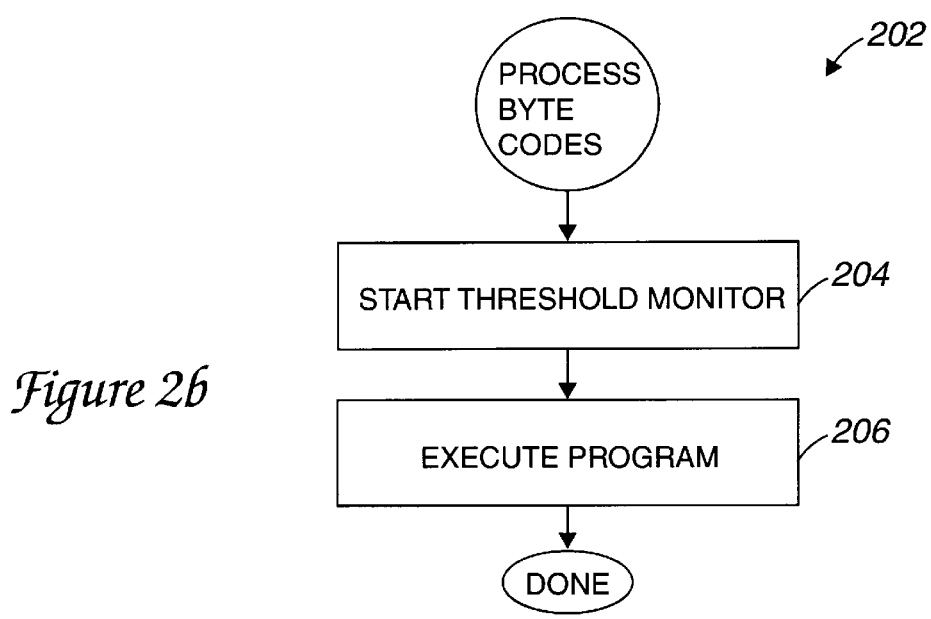
FIG. 2b is a process flow diagram which illustrates the steps associated with processing byte codes in accordance with an embodiment of the present invention.

FIG. 2b is a process flow diagram which illustrates the steps associated with processing byte codes, e.g., a machine-independent computer program, in accordance with an embodiment of the present invention. The process 202 begins at step 204 where a threshold monitor is started. The threshold monitor executes concurrently with a computer program, as will be described below, and keeps track of a threshold which indicates the number of times a particular method is to be executed before the method may be considered for compilation. One embodiment of a threshold monitor will be described below with reference to FIG. 7.

In step 206, a computer program, which is made up of byte codes is executed, as will be discussed below with respect to FIG. 3. After the computer program is executed, the method of processing byte codes is completed. It should be appreciated that, in the described embodiment, the threshold monitor and the program are executed substantially simultaneously, i.e., as parallel processes. In other words, step 204 and 206 are essentially executed in parallel.

Figure 3:
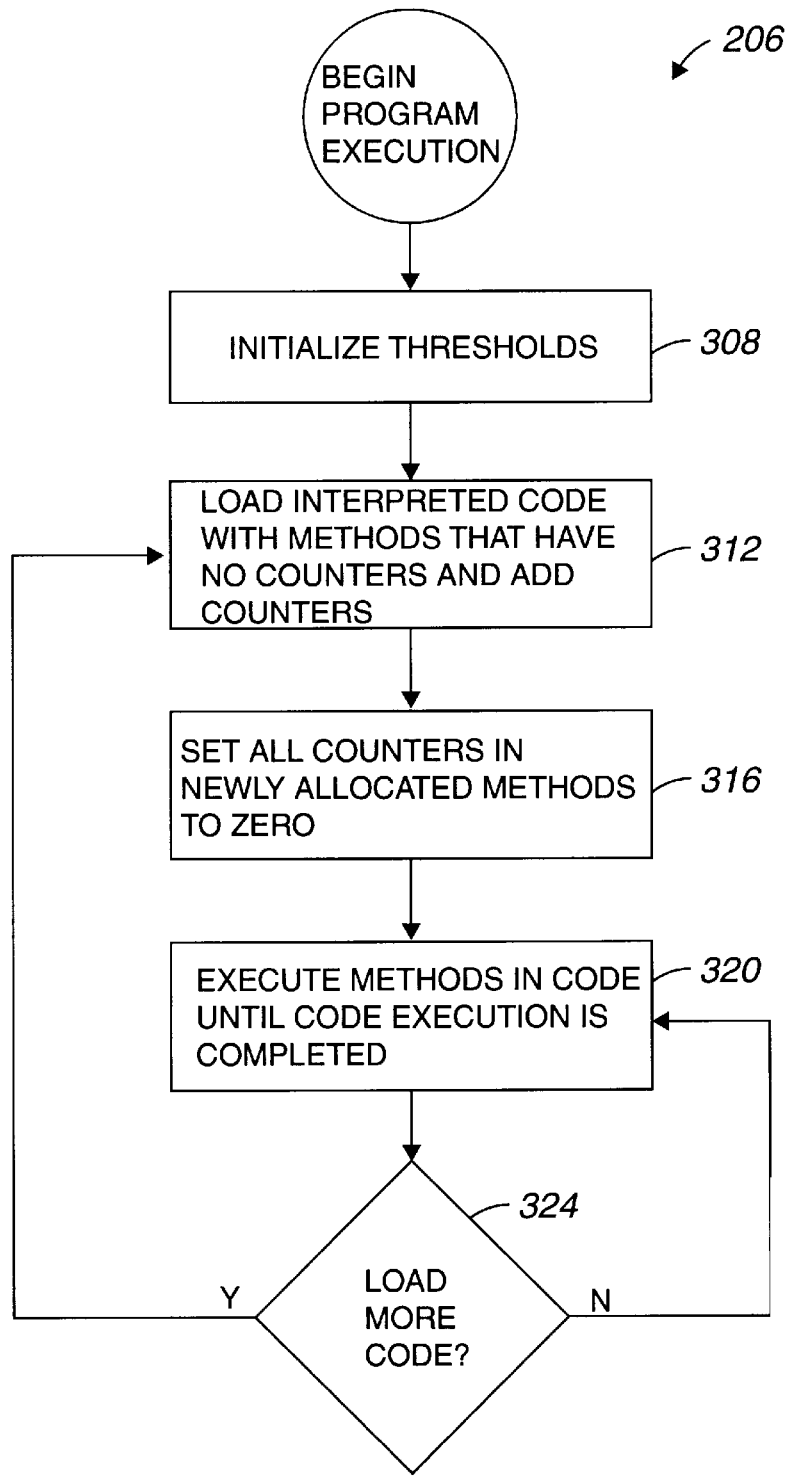
FIG. 3 is a process flow diagram which illustrates the steps associated with the execution of a program, i.e., step 206 of FIG. 2b, in accordance with an embodiment of the present invention.

Referring next to FIG. 3, the steps associated with the execution of a program will be described in accordance with an embodiment of the present invention. That is, step 206 of FIG. 2b will be described. In step 308, thresholds are initialized. In one embodiment, the threshold is an upper-limit threshold which indicates the number of times a particular method is to be executed before the method may be considered for compilation. The threshold may generally be widely varied depending upon the requirements, e.g., memory requirements and performance requirements, of a particular system. By way of example, a threshold may be initialized to be in the range of approximately 1000 to 10,000.

In one embodiment, there may be only a single threshold for all methods associated with a program execution, i.e., the threshold may be a global constant or a global variable. However, it should be appreciated that in other embodiments, multiple thresholds may exist, e.g., thresholds may be method-specific constants or method specific variables.

After thresholds are initialized in step 308, interpreted code, which includes methods that have no execution counters, are loaded and execution counters are added to the methods in step 312. In other words, methods are allocated and counters are added to the newly allocated methods. Once counters are added, the counters in the newly allocated methods are initialized, e.g., set to zero, in step 316.

From step 316, process flow proceeds to step 320 where the methods in the loaded code are executed until code execution is completed, or substantially all appropriate methods in the loaded code have been executed. During code execution, control flow may reach methods which have not been previously loaded, in which case the code may be dynamically loaded, as will be appreciated by those skilled in the art. The steps associated with executing a method M will be described in more detail below with respect to FIG. 4. During the course of code execution, a determination is made in step 324 regarding whether there is more interpreted code to be loaded. If it is determined that additional interpreted code is to be loaded, then process flow returns to step 312 where the additional code is loaded. Alternatively, if it is determined that there is no additional interpreted code to be loaded, then code execution continues in step 320.

Figure 4:
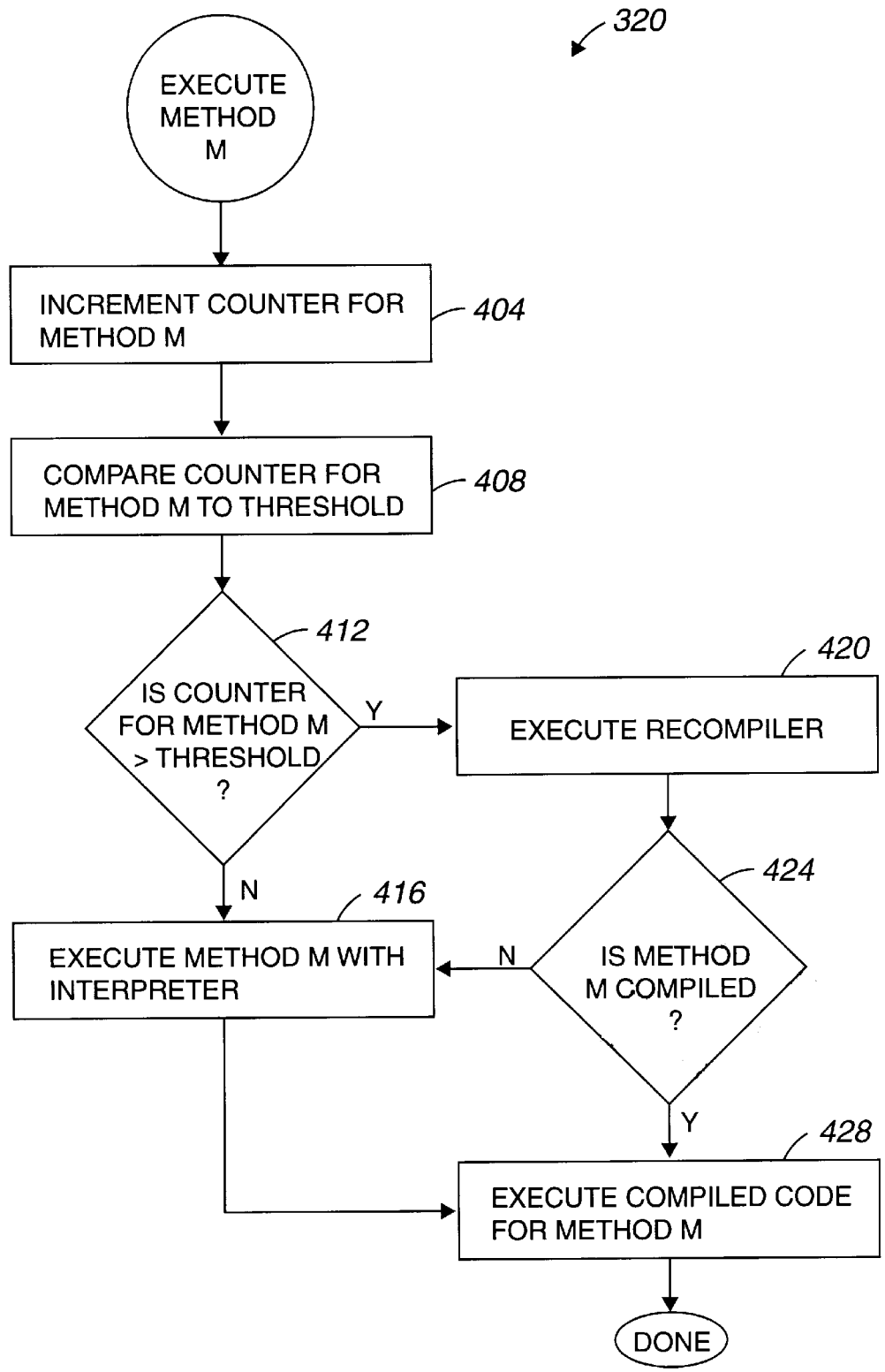
FIG. 4 is a process flow diagram which illustrates the steps associated with executing a method, i.e., step 320 of FIG. 3, in accordance with an embodiment of the present invention.

FIG. 4 is a process flow diagram which illustrates the steps associated with executing a method, i.e., step 320 of FIG. 3, in accordance with an embodiment of the present invention. The execution of method M begins in step 404 in which the counter, i.e., the execution counter, for method M is incremented. After the counter is incremented, the counter for method M is compared to the threshold in step 408. As previously mentioned, the threshold is an indication of how many times method M may be executed before method M is considered for possible compilation.

A determination is made in step 412 as to whether the counter for method M exceeds the threshold. If the counter for method M does not exceed the threshold, then the indication is that it is not necessary to compile method M. Accordingly, process flow moves from step 412 to step 416 in which method M is executed with an interpreter. Alternatively, if the determination in step 412 is that the counter for method M exceeds the threshold, then the implication is that the execution of the overall program may be more efficient if method M were compiled, rather than interpreted. As such, when it is determined that the counter for method M exceeds the threshold, a recompiler is executed in step 420. The steps associated with executing a recompiler will be described in more detail below with reference to FIG. 5.

After the recompiler is executed in step 420, process flow proceeds to step 424 in which a determination is made regarding whether method M is compiled. That is, a determination is made as to whether method M was compiled as a result of the execution of the recompiler in step 420. If it is determined that method M is not compiled, then process flow moves to step 416 where method M is executed via interpretation. If the determination in step 424 is that method M is compiled, then the compiled code for method M is executed in step 428.

Figure 5:
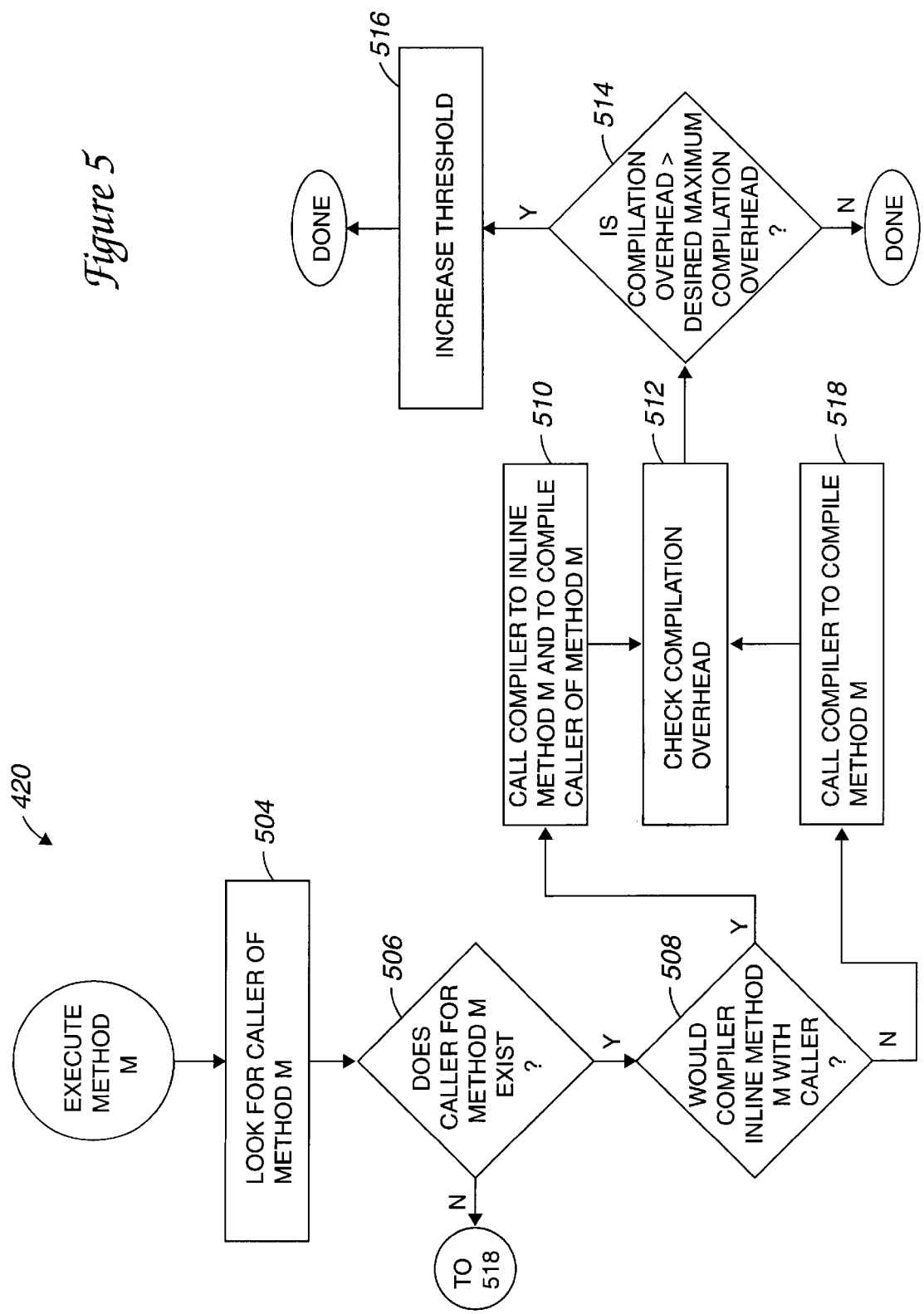
FIG. 5 is a process flow diagram which illustrates the steps associated with executing a recompiler, i.e., step 420 of FIG. 4, in accordance with an embodiment of the present invention.

As mentioned above, in one embodiment, a recompiler is used to determine how a compiler will process a given method, e.g., method M. Such a recompiler may be arranged to actually call a compiler to compile method M, if it is determined that a compilation would be beneficial to the execution of the overall program. FIG. 5 is a process flow diagram which illustrates the steps associated with executing a recompiler, i.e., step 420 of FIG. 4, in accordance with an embodiment of the present invention. The execution of a recompiler begins at step 504 where a search is made for the direct caller of method M. In general, the search for the caller, or the method that called method M, entails inspecting a call stack, as will be appreciated by those skilled in the art.

After a search for the caller of method M, in step 506, it is determined whether a caller for method M exists. If it is determined that a caller for method M exists, then process flow proceeds to step 508 where a determination is made regarding whether the compiler associated with the overall program would inline method M with the caller. Inlining method M with the caller generally entails making a copy of the interpreted code for method M, and incorporating the copied code into the caller, after removing unnecessary portions of code, e.g., code involving the passage of parameters or variables from the caller to method M. If the caller is executed repeatedly, thereby causing method M to be executed repeatedly, or if the caller typically calls method M repeatedly, then inlining method M into the caller and compiling the caller may serve to increase the efficiency of the overall program execution. However, inlining method M into the caller does not eliminate the non-inlined version of method M, due to the fact that other methods may call method M, so method M must remain accessible to the other methods. As such, inlining method M into the caller may not necessarily improve the efficiency of the overall program execution, since the physical amount of code associated with the program increases when method M is inlined.

If it is determined in step 508 that the compiler would inline method M with the caller, then, in the described embodiment, the implication is that the improvement in the efficiency of the overall program execution essentially outweighs the addition of extra program code. As a result, process flow moves from step 508 to step 510 in which a call is made to the compiler to inline method M and to compile the caller of method M, with method M inlined therein.

The decision to inline method M into the caller of method M may involve a variety of different factors. By way of example, the factors may include, but are not limited to, the size of method M, the size of the caller, the value of parameters associated with method M and the caller, and the number of methods which call method M. In general, it should be appreciated that inlining method M may not only entail inlining method M into the caller of method M, but may also involve the inlining the caller of method M into the caller of the caller. In other words, the callers may be looked-up in the stack for any number of levels.

After method M is inlined and the caller is compiled, the compilation overhead is checked in step 512. In general, checking the compilation overhead entails monitoring the overhead associated with compiling methods during run-time. The compilation overhead is then compared against the desired maximum compilation overhead. The desired maximum compilation overhead, in one embodiment, may be a measure of the maximum percentage of the overall system overhead, e.g., central processing unit (CPU) or elapsed time, that is to be spent compiling methods, or otherwise translating methods into machine code, during run-time. Hence, checking the compilation overhead entails determining the amount of system overhead which is actually being used to compile methods at run-time.

A determination is made in step 514 regarding whether the compilation overhead exceeds the desired maximum compilation overhead. If it is determined that the compilation overhead exceeds the desired maximum compilation overhead, then the implication is that too many methods are being compiled, and process flow moves to step 516 where the threshold is increased. Increasing the threshold is typically effective in reducing the compilation overhead, since increasing the threshold increases the number of times a method is to be invoked before the method is considered for compilation. By way of example, if the threshold is set at 1000, and substantially all methods are invoked at least 1000 times during the course of a program execution, then raising the threshold to 10,000 may result in a lower compilation overhead, as fewer methods are likely to be compiled. The steps associated with increasing the threshold will be described in more detail below with respect to FIG. 6. Once the threshold is increased in step 516, the process of executing a recompiler is completed.

If it is determined in step 514 that the compilation overhead is less than the desired maximum compilation overhead, then the threshold is considered to be acceptable. That is, the overhead associated with compiling methods and executing the compiled methods is considered to be at an acceptable level. As such, the execution of a recompiler is completed.

Returning to step 508, if the determination is that the compiler associated with the execution of the overall program would not inline method M with the caller, then in step 518, the compiler is called to compile method M. Compiling method M alone, without inlining method M, generally reduces the volume of code associated with the overall program. As previously mentioned, inlining method M essentially results in a copy of method M being made. It follows that if method M is called by different methods, method M may eventually be inlined in each of the different methods. Therefore, copies of the code associated with method M may be proliferated throughout the overall program, and the amount of compilation associated with compiling the inlined code may be significant. Hence, in one embodiment, in order to save space and to reduce the amount of compilation, if method M is likely to be called by more than one method, rather than inlining method M, method M may be compiled alone. After method M is compiled in step 518, process flow moves to step 512 where the compilation overhead is checked. The determination of whether method M is likely to be called by more than one method may involve studying call chains, as will be appreciated by those skilled in the art.

Returning to step 506, which is the step of determining whether a caller for method M exists, if it is determined that a caller for method M does not exist, or otherwise has not been found during a search for a caller, process flow proceeds to step 518 where method M is compiled. When a caller is not found, the implication is that method M was called by the runtime system, and not by another method.

As mentioned above, a threshold may be increased in the event that the compilation overhead associated with the overall execution of a program is greater than the maximum desired overhead. The use of such an adaptive threshold generally allows the threshold to be modified as necessary for a particular application. For an application in which many methods, or functions, exceed a certain number of invocations, if the corresponding threshold is too low, the result may be an undesirably high compilation overhead in terms of efficiency, e.g., time and space. Accordingly, setting a higher threshold may result in a more desirable, i.e., lower, compilation overhead.

Increasing thresholds during the course of program execution may also prevent the compilation of methods in close succession. By way of example, if a relatively large number of different methods exceeds a particular threshold value at substantially the same time, pauses may occur during the execution of the overall program. Since a pause during program execution is often undesirable, increasing the threshold value after the first few methods are compiled prevents a sequence of compilations in close succession, thereby substantially eliminating significant compilations pauses.

Figure 6:
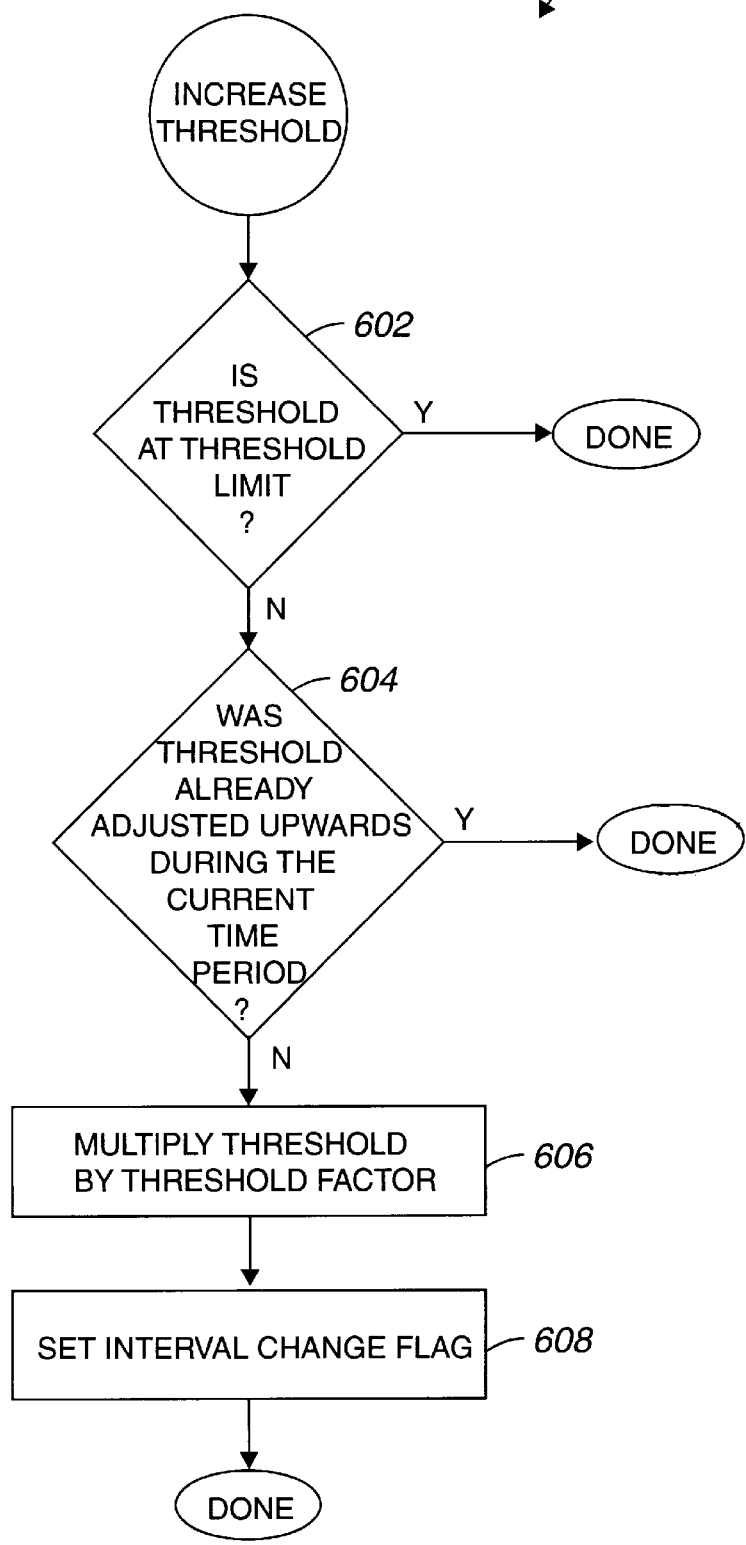
FIG. 6 is a process flow diagram which illustrates the steps associated with increasing a threshold, e.g., step 516 of FIG. 5, in accordance with an embodiment of the present invention.

Referring next to FIG. 6, the steps associated with increasing a threshold will be described in accordance with an embodiment of the present invention. In other words, step 516 of FIG. 5 will be described. It should be appreciated that for an embodiment in which the threshold is a global value, increasing the threshold involves increasing the global value. Alternatively, if the threshold is a method-specific value, then increasing the threshold involves increasing only the threshold for a specific method or group of methods.

The process of increasing a threshold begins at step 602 in which a determination is made regarding whether the threshold is at a threshold limit, i.e., an upper threshold limit. The threshold limit, which may be dependent upon the requirements of the overall program which is being executed, is generally the highest value for a threshold which is considered to be acceptable.

If the determination in step 602 is that the threshold is at the threshold limit, then, in the described embodiment, the threshold may not be increased. As such, the process of increasing the threshold is considered to be completed. By way of example, threshold limits on the order of approximately 1000 invocations to approximately 50,000 invocations may be appropriate for existing systems. If, instead, the determination in step 602 is that the threshold is not at the threshold limit, then in step 604, a determination is made as to whether the threshold had previously been adjusted upwards during the current time period. In one embodiment, determining whether the threshold has previously been adjusted during the current time period involves determining whether an associated interval change flag indicates that an adjustment has recently been made. Representative mechanisms for setting and clearing the interval change flag are described below.

If it is determined in step 604 that the threshold was already adjusted upwards during the current time period, e.g., the recent past, then the threshold is not increased any further. By not further increasing the threshold when it has been recently adjusted, the threshold may be prevented from being over-adjusted. If it is determined in step 604 that the threshold is not to be increased any further, the process of increasing the threshold is considered to be completed.

When the determination in step 604 is that the threshold was not adjusted upwards during the current time period, then process flow moves to step 606, where the threshold is multiplied by a threshold factor. The threshold factor may generally be widely varied, depending upon the requirements of the overall computer program. By way of example, threshold factors on the order of approximately 1.2 to approximately 2 tend to work well with current systems. After the threshold is multiplied by the threshold factor to increase the threshold, an interval change flag is set in step 608. The interval change flag may be used to indicate that the threshold was adjusted upwards during the current time period. The process of increasing the threshold is completed after the interval change flag is set.

Figure 7:
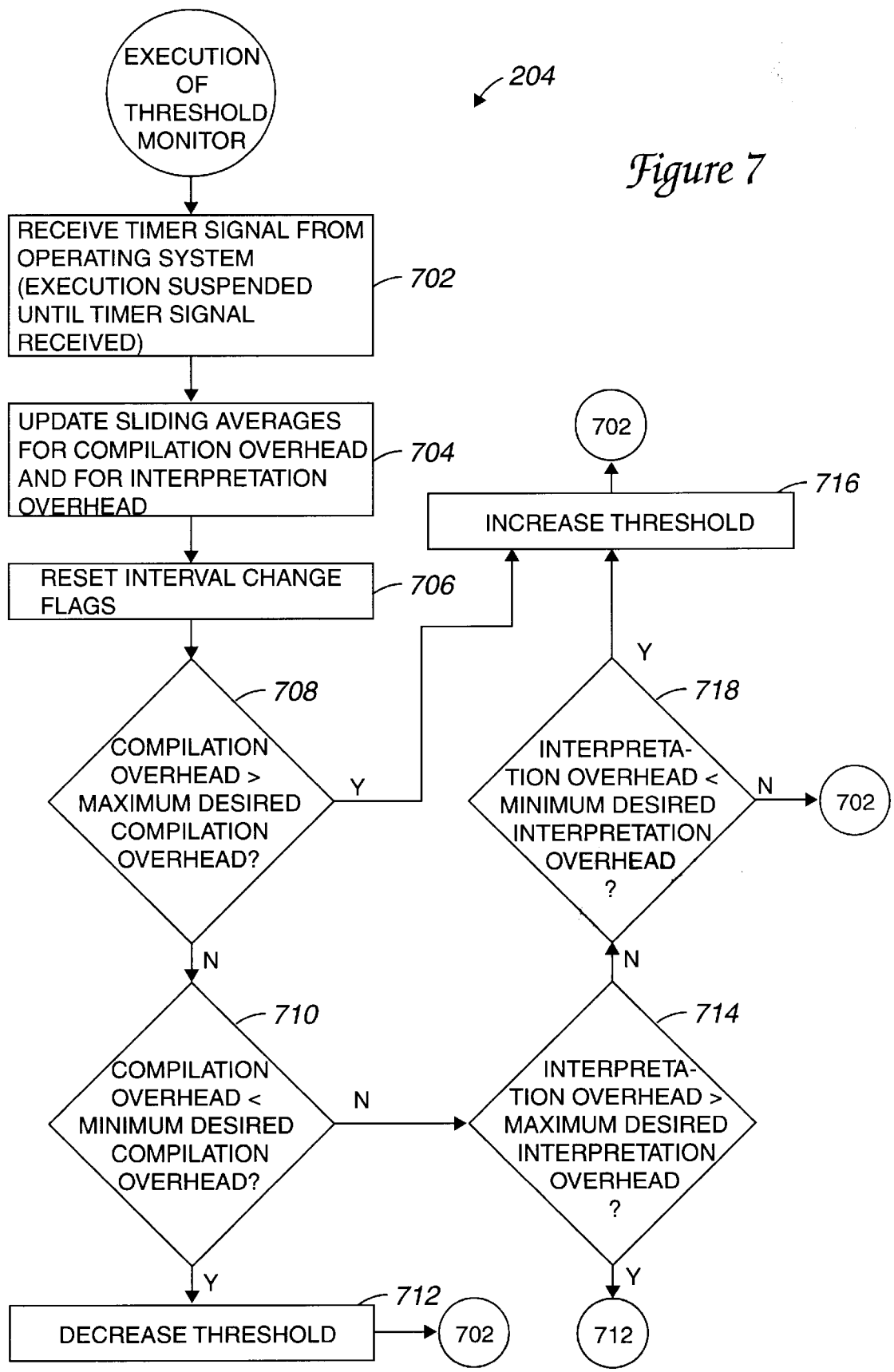
FIG. 7 is a process flow diagram which illustrates the steps associated with the execution of a threshold monitor, i.e., step 204 of FIG. 2b, in accordance with an embodiment of the present invention.

In the described embodiment, as discussed above with respect to FIG. 2b, the beginning of the execution of a program occurs in parallel with the beginning of the execution of a threshold monitor. That is, while the program is executing, the threshold monitor is also executing. FIG. 7 is a process flow diagram which illustrates the steps associated with beginning the execution of a threshold monitor, i.e., step 204 of FIG. 2b, in accordance with an embodiment of the present invention. The execution of the threshold monitor begins at step 702 where a timer signal is received from the operating system by the threshold monitor. The timer signal is essentially a clock "tick" which periodically interrupts the execution of the program. As will be appreciated by those skilled in the art, the execution of the threshold monitor may be suspended, i.e., the threshold monitor may be "asleep," until the timer signal is received.

Once the timer signal is received, sliding averages are updated in step 704 for both the compilation overhead and the interpretation overhead. In other words, both the amount of time spent in compilation and the amount of time spent in interpretation in a given time period, e.g., the recent past, may be expressed as percentages of the time period, averaged over a number of time intervals in the time period.

Interval change flags are reset in step 706 after the sliding averages are updated. Resetting interval change flags generally entails setting the interval change flags to indicate that thresholds have not been adjusted during the given time period. After the interval change flags are reset, a determination is made in step 708 regarding whether the compilation overhead exceeds a maximum desired compilation overhead. The compilation overhead is preferably maintained such that it falls in the range between a minimum desired compilation overhead and the maximum desired compilation overhead. Although the values for the minimum desired compilation overhead and the maximum desired compilation overhead may be widely varied, minimums in the range of approximately 5 percent to approximately 25 percent, and maximums in the range of approximately 20 percent to approximately 65 percent, have been found to work well in some systems. In one specific embodiment, the minimum desired compilation overhead may be approximately 10 percent of a given time period, while the maximum desired compilation overhead may be approximately 50 percent of a given time period.

If it is determined in step 708 that the compilation overhead is greater than the maximum desired compilation overhead, then process flow proceeds to step 716 where the threshold, e.g., the global threshold value, is increased. One suitable method used for increasing the threshold was previously described with respect to FIG. 6. Once the threshold is increased, then process flow returns to step 702 where the process awaits a new timer signal received from the operating system.

If the determination in step 708 is that the compilation overhead is less than the maximum desired compilation overhead, then a determination is made regarding whether the compilation overhead is less than the minimum desired compilation overhead in step 710. If the compilation overhead is less than the minimum desired compilation overhead, then the threshold may be too high. As such, in order to allow the compilation overhead to fall between the minimum desired compilation overhead and the maximum desired compilation overhead, the threshold is decreased in step 712. Decreasing the threshold, as will be described in more detail below with reference to FIG. 8, allows the threshold value to be more readily reached, thereby resulting in an increase in the compilation of methods. Hence, the compilation overhead may be increased to above the minimum desired compilation overhead. After the threshold is decreased, then process flow returns to step 702 in which the process of executing a threshold monitor is essentially suspended until a timer signal is received.

Figure 9:
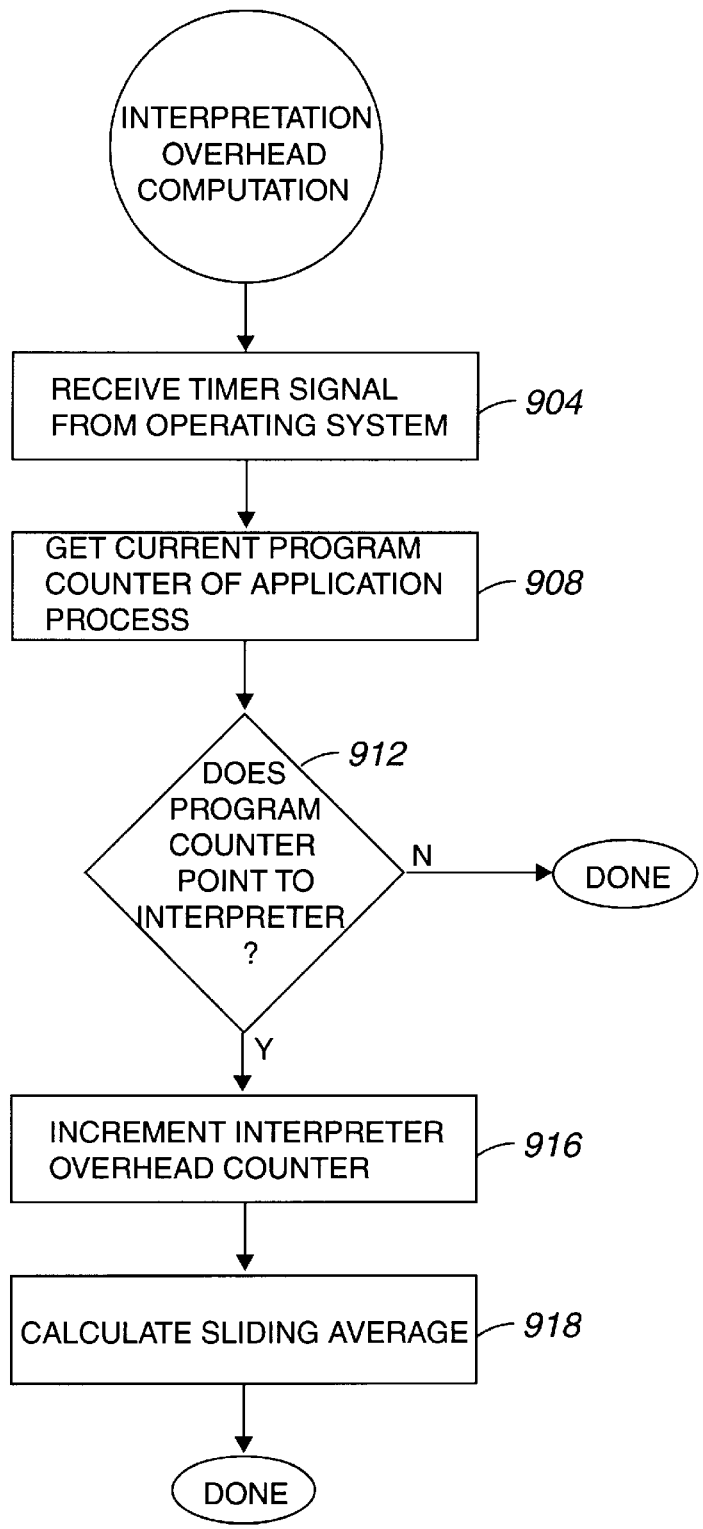
FIG. 9 is a process flow diagram which illustrates the steps associated with computing an interpretation overhead in accordance with an embodiment of the present invention.

When the compilation overhead is determined to be between the maximum desired interpretation overhead and the minimum desired interpretation overhead, then in step 714, a determination is made regarding whether the interpretation overhead is greater than the maximum desired interpretation overhead. One suitable method for calculating interpretation overhead will be discussed below with reference to FIG. 9.

As was the case for the maximum desired compilation overhead, the maximum desired interpretation overhead may also be widely varied. In addition, the minimum desired interpretation overhead may be widely varied as well. By way of example, the maximum desired interpretation overhead may be approximately 20 percent of a given time period, while the minimum desired interpretation overhead may be approximately five percent of a given time period. In one embodiment, the desired interpretation overheads may be substantially the same as the desired compilation overheads.

If the interpretation overhead is greater than the maximum desired interpretation overhead, then the threshold is decreased in step 712, using any suitable process such as the process described below with respect to FIG. 8. Decreasing the threshold generally enables more methods to be compiled, thereby reducing the number of methods which are interpreted. Alternatively, if the interpretation overhead is determined to be less than the maximum desired interpretation overhead, then in step 718, it is determined whether the interpretation overhead falls below the minimum desired interpretation overhead. When the interpretation overhead is less than the minimum desired interpretation overhead, then the threshold is increased in step 716. In the event that the interpretation overhead is within the range of acceptable interpretation overheads defined by the minimum desired interpretation overhead and the maximum desired interpretation overhead, then the process of executing the threshold monitor continues in step 702 where a new timer signal is received from the operating system.

Figure 8:
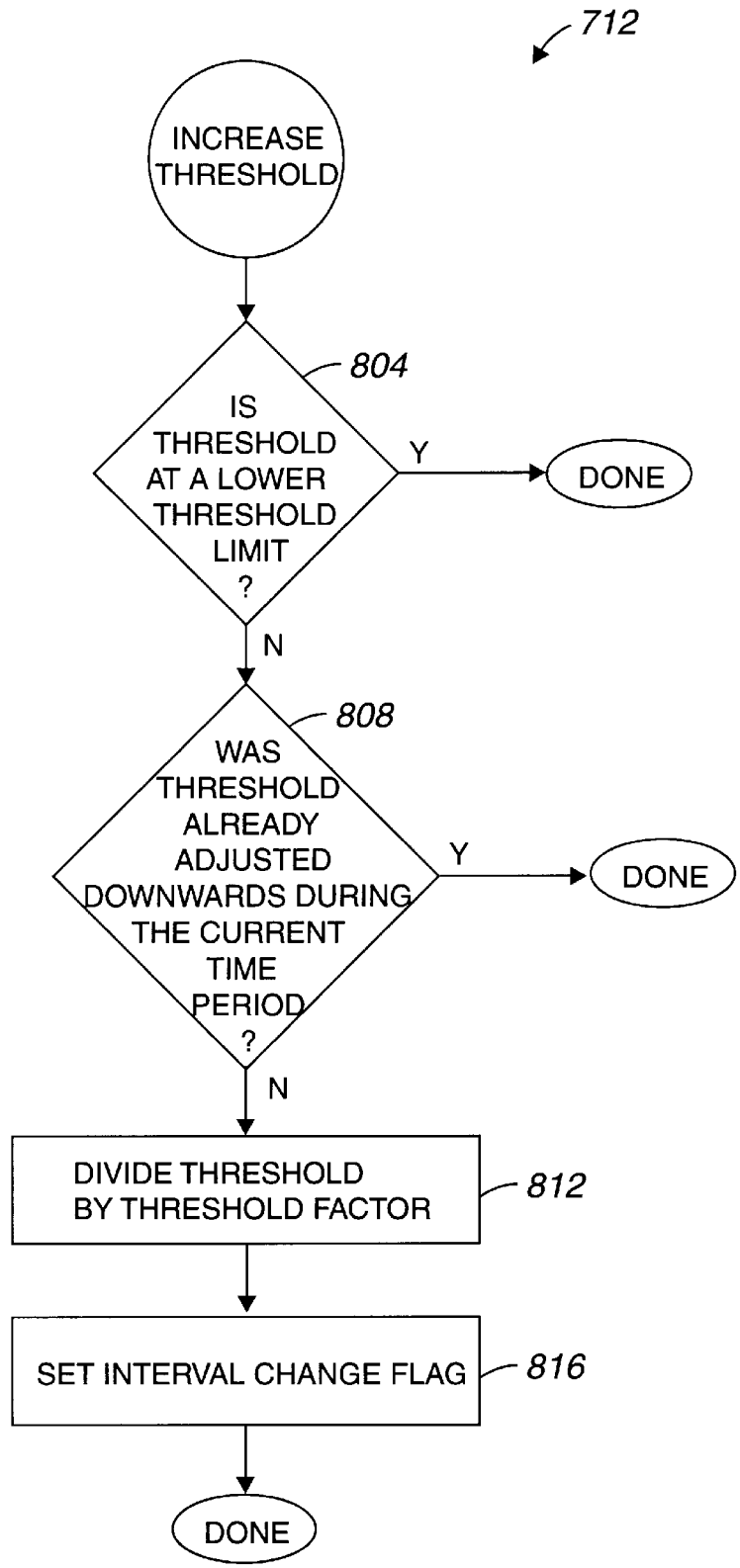
FIG. 8 is a process flow diagram which illustrates the steps associated with decreasing a threshold, i.e., step 712 of FIG. 7, in accordance with an embodiment of the present invention.

With reference to FIG. 8, the steps associated with decreasing a threshold, i.e., step 712 of FIG. 7, will be described in accordance with an embodiment of the present invention. The process of decreasing a threshold begins at step 804 where a determination is made regarding whether the threshold is at a lower threshold limit. The lower threshold limit, is generally the lowest value for a threshold which is considered to be reasonable. By way of example, although lower threshold limits may be widely varied, lower threshold limits on the order of approximately 100 counts to approximately 1000 counts work well. In one embodiment, the lower threshold limit may be approximately 500 counts, or invocations.

If the determination in step 804 is that the threshold is at the lower threshold limit, then the implication is that the threshold may not be lowered, and the process of decreasing the threshold is considered to be completed. If, instead, the determination in step 804 is that the threshold is not at the lower threshold limit, then in step 808, a determination is made as to whether the threshold had previously been adjusted downwards during the current time period.

If it is determined that the threshold was adjusted downwards in the recent past, or the current time period, then, in the described embodiment, the threshold may not be decreased any further. By not allowing the threshold to be adjusted downwards more than once in a given time period, an over-adjustment of the threshold may be avoided. When it is determined that the threshold is not to be decreased any further, the process of decreasing the threshold is considered to be completed.

If the threshold has not been adjusted downwards during the current time period, then process flow moves from step 808 to step 812 in which the threshold is divided by a threshold factor. The threshold factor may generally be widely varied, depending upon the requirements of the overall computer program. In one embodiment, the threshold factor which the threshold is divided by is the same threshold factor which is used as a multiplier when the threshold is increased, as mentioned above with respect to FIG. 6. Once the threshold is divided by the threshold factor, an interval change flag is set in step 816. In the described embodiment, the interval change flag is set to indicate that the threshold was adjusted downwards during the current time period. After the interval change flag is set, the process of decreasing the threshold is completed.

In addition to monitoring the compilation overhead associated with a program during run-time, the interpretation overhead associated with the program is also monitored. Monitoring the interpretation overhead essentially involves monitoring the amount of overall program overhead which is spent interpreting methods. As previously described with respect to FIG. 7, interpretation overhead is monitored to determine, at least in part, whether the threshold should be raised or lowered. For example, if the interpretation overhead is too high, then the implication is that more methods should be compiled, and the threshold may be decreased to allow more methods to be compiled.

Generally, any suitable process may be used to compute interpretation overhead. One suitable process for computing interpretation overhead in accordance with an embodiment of the present invention will be described below with reference to FIG. 9. The process begins at step 904 where a timer signal is received from an operating system. Once the timer signal is received, the current program counter of the application process is obtained in step 908. In one embodiment, the program counter is a reference which identifies whether the execution of the overall program currently involves interpreted code or compiled code.

Once the current program counter is obtained, a determination is made regarding whether the program counter references, e.g., points to, the interpreter in step 912. That is, a determination is made as to whether interpreted code is currently being executed. If it is determined that the program counter is not pointing to the interpreter, then the indication is that the program counter is pointing to a compiler, and the computation of the interpretation overhead is completed. If the determination in step 912 is that the program counter does reference the interpreter, then an interpreter overhead counter is incremented in step 916. Finally, in step 918, a sliding average for the interpretation overhead is calculated, using the interpreter overhead counter, and the process of computing interpretation overhead is completed.

Figure 10:
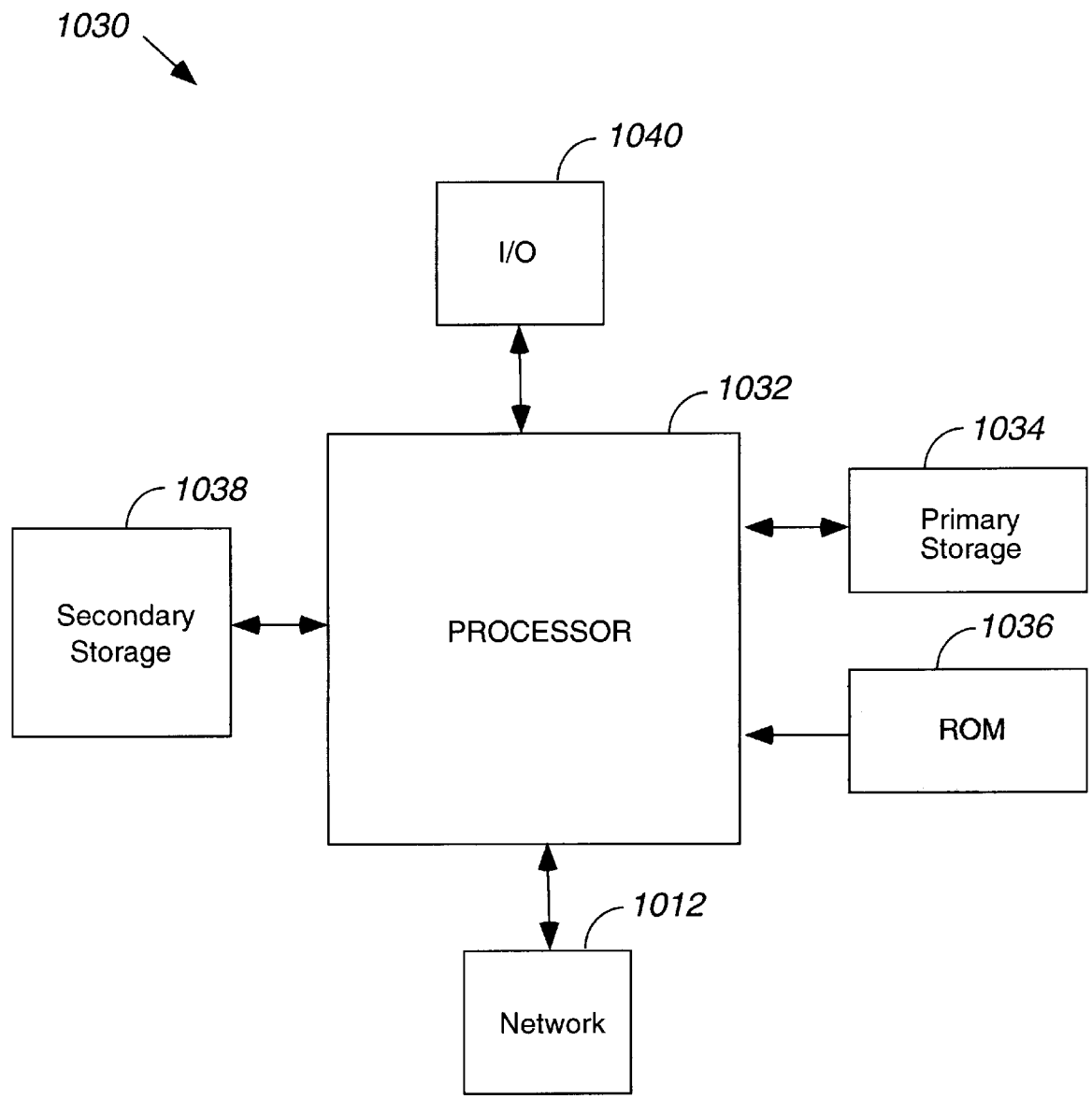
FIG. 10 is a diagrammatic representation of a general purpose computer system suitable for implementing the present invention.

FIG. 10 illustrates a typical, general purpose computer system suitable for implementing the present invention. The computer system 1030 includes any number of processors 1032 (also referred to as central processing units, or CPUs) that are coupled to memory devices including primary storage devices 1034 (typically a read only memory, or ROM) and primary storage devices 1036 (typically a random access memory, or RAM).

Computer system 1030 or, more specifically, CPU 1032, may be arranged to support a virtual machine, as will be appreciated by those skilled in the art. One example of a virtual machine that is supported on computer system 1030 will be described below with reference to FIG. 11. As is well known in the art, ROM acts to transfer data and instructions uni-directionally to the CPU 1032, while RAM is used typically to transfer data and instructions in a bi-directional manner. CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data unidirectionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1012. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Figure 11:
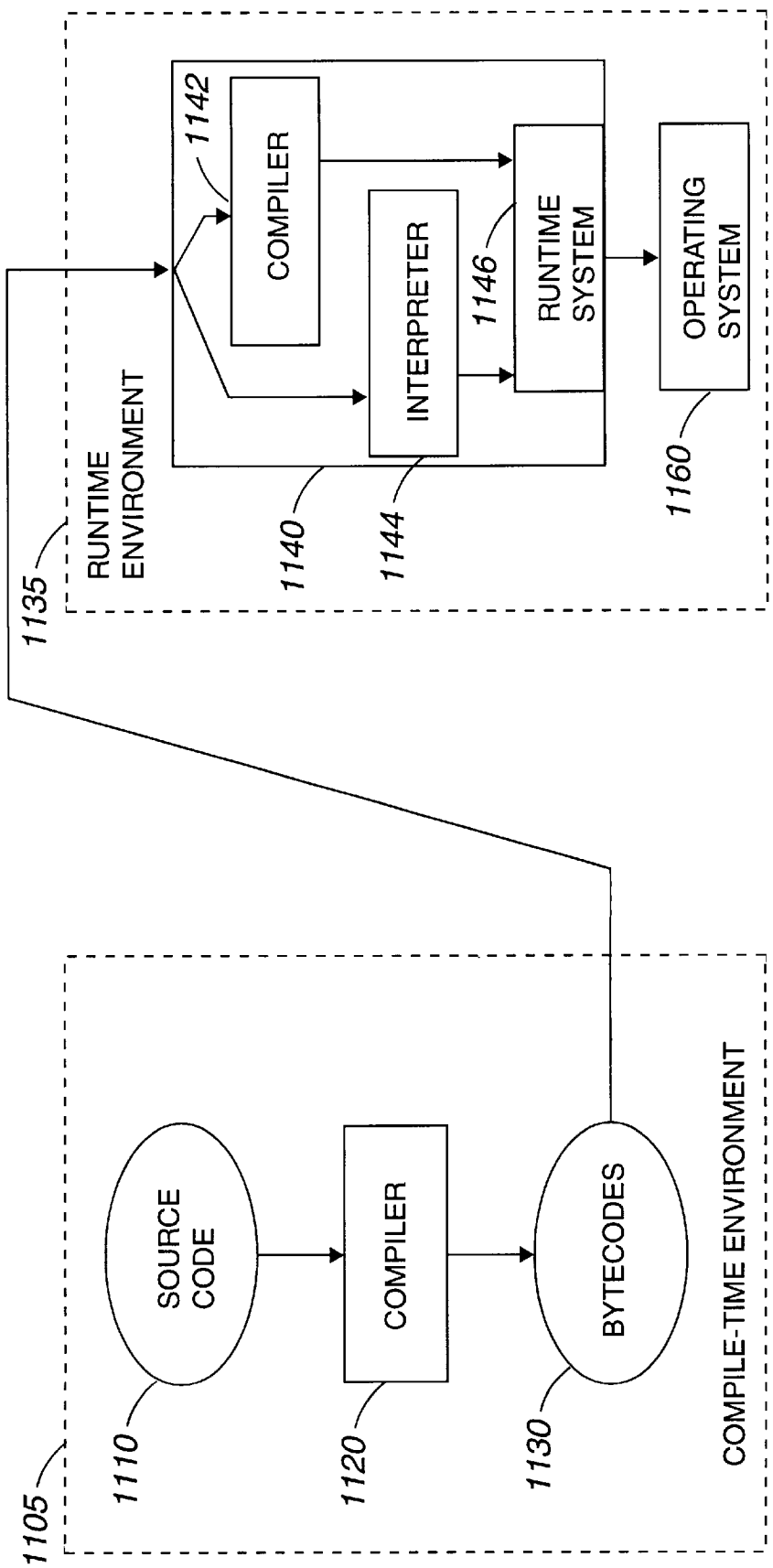
FIG. 11 is a diagrammatic representation of a virtual machine which is supported by the computer system of FIG. 10, and is suitable for implementing the present invention.

As previously mentioned, a virtual machine may execute on computer system 1030. FIG. 11 is a diagrammatic representation of a virtual machine which is supported by computer system 1030 of FIG. 10, and is suitable for implementing the present invention. When a computer program, e.g., a computer program written in the Java™ programming language developed by Sun Microsystems of Palo Alto, Calif., is executed, source code 1110 is provided to a compiler 1120 within a compile-time environment 1105. Compiler 1120 translates source code 1110 into byte codes 1130. In general, source code 1110 is translated into byte codes 1130 at the time source code 1110 is created by a software developer.

Byte codes 1130 may generally be reproduced, downloaded, or otherwise distributed through a network, e.g., network 1012 of FIG. 10, or stored on a storage device such as primary storage 1034 of FIG. 10. In the described embodiment, byte codes 1130 are platform independent. That is, byte codes 1130 may be executed on substantially any computer system that is running a suitable virtual machine 1140. By way of example, in a Java™ environment, byte codes 1130 may be executed on a computer system that is running a Java™ virtual machine.

Byte codes 1130 are provided to a runtime environment 1135 which includes virtual machine 1140. Runtime environment 1135 may generally be executed using a processor such as CPU 1032 of FIG. 10. Virtual machine 1140 includes a compiler 1142, an interpreter 1144, and a runtime system 1146. Byte codes 1130 may generally be provided either to compiler 1142 or interpreter 1144.

When byte codes 1130 are provided to compiler 1142, methods contained in byte codes 1130 are compiled into machine instructions, as described above. On the other hand, when byte codes 1130 are provided to interpreter 1144, byte codes 1130 are read into interpreter 1144 one byte code at a time. Interpreter 1144 then performs the operation defined by each byte code as each byte code is read into interpreter 1144. In general, interpreter 1144 processes byte codes 1130 and performs operations associated with byte codes 1130 substantially continuously.

When a method is called from an operating system 1160, if it is determined that the method is to be invoked as an interpreted method, runtime system 1146 may obtain the method from interpreter 1144. If, on the other hand, it is determined that the method is to be invoked as a compiled method, runtime system 1146 activates compiler 1142. Compiler 1142 then generates machine instructions from byte codes 1130, and executes the machine-language instructions. In general, the machine-language instructions are discarded when virtual machine 1140 terminates. The operation of virtual machines or, more particularly, Java™ virtual machines, is described in more detail in The Java™ Virtual Machine Specification by Tim Lindholm and Frank Yellin (ISBN 0-201-63452-X), which is incorporated herein by reference in its entirety.

Although only a few embodiments of the present invention have been described, it should be understood that the present invention may be embodied in many other specific forms without departing from the spirit or the scope of the invention. By way of example, steps involved with executing a recompiler may be reordered, removed or added. Further, in some embodiments, the option to inline a method into a caller of the method may be eliminated. In general, steps involved with the methods of the present invention may be reordered, removed, or added without departing from the spirit or the scope of the present invention.

While the execution of a recompiler has been described in terms of determining whether a compiler would compile a given method and compiling the given method, it should be appreciated that the compilation of the given method may be delayed after the determination that the given method is to be compiled. In the event that multiple methods are being compiled substantially simultaneously, the compilation of the given method may be delayed until fewer methods are being compiled, e.g., the compilation overhead falls below the minimum desired compilation overhead. Delaying the compilation of the given method may serve to prevent the compilation overhead from exceeding the maximum desired compilation overhead. Further, delaying the compilation may also serve to prevent relatively long compilation pauses during the execution of a program. In one embodiment, the compilation of a method in a program may be delayed until there is a pause in the overall execution of the program. In such an embodiment, the method may be placed in a queue that is accessed during a pause, or a period of low activity, during the overall execution of the program. The compilation of methods during pauses is described in co-pending U.S. patent application Ser. No. 08/944,735(Atty. Docket No.:SUN147/P2297), which is incorporated herein by reference in its entirety.

In addition, although the present invention has been described in terms of all methods initially being interpreted, it should be appreciated that when a computer program in the form of byte codes is first provided to a run-time environment, at least some methods associated with the program may be compiled immediately. For example, in order for a desired compilation overhead to be met by a program from the beginning of execution, some methods may be initially compiled, while others are initially interpreted until the number of invocations of given interpreted methods exceed a threshold, at which point the given interpreted methods are compiled.

Although a counter which is placed within an interpreted method, as mentioned above with respect to FIG. 3, may generally be placed anywhere within the method, accessing the counter while the method is running may be expensive. As such, when a counter is placed within an interpreted method, the counter may be placed at the beginning of the method such that the counter may be more easily accessed. In some embodiments, due to costs associated with accessing counters placed in methods, a single global counter may be used for all methods. When the global counter reaches its threshold, the method that is currently running may be considered for recompilation as if the current method had reached its invocation counter threshold.

In general, a counter may be incremented at any time during the invocation of the method which includes the counter. For example, the counter may be incremented while a backwards branch of a loop within the method is executing. Incrementing a counter at a backwards branch of a loop, or substantially anywhere within a loop, facilitates the detection of long running loops within the method. A long-running loop may be repeatedly executed during a single invocation of a method. By placing a counter within the loop, e.g., in the backwards branch of the loop, each iteration of the loop may be counted as an invocation of the method, thereby allowing methods which utilize a significant amount of execution time to be more readily considered for compilation. It should be appreciated that the counter in the loop may, in some embodiments, increment a "global" loop counter which is more easily accessed than the counter within the method, since it may be expensive to access the counter of a method while the method is running.

In an embodiment which uses a "loop counter threshold," the loop counter threshold may be different from the invocation threshold described above. The loop counter threshold may also be increased and decreased by a different threshold factor. However, in general, the loop counter threshold may be adjusted substantially in tandem with the invocation threshold.

Counters have generally been described as being placed within methods. However, it should be appreciated that in lieu of placing counters within methods, counters may instead be kept in a database or a table which may be accessed each time a method is invoked. The database or, more specifically, counters in the database may then be updated each time the method corresponding to a particular counter is invoked without departing from the spirit or the scope of the present invention.

Generally, the thresholds in accordance with the present invention may be widely varied. For example, although a threshold of 1000 may be adequate for some executions, for executions in which substantially all methods are executed more than 1000 times, a higher threshold may be suitable. Similarly, the minimum and the maximum desired compilation overhead, in addition to the minimum and the maximum desired interpretation overhead, may be widely varied, depending upon the requirements of a particular system.

A value for a threshold may be chosen based on a variety of different factors. Such factors may include, but are not limited to, a percentage of program execution. In other words, a threshold may be chosen such that methods which are accountable for a given percentage, e.g., more than half, of overall program execution are compiled. By way of example, a threshold may be adjusted such that methods which account for approximately 95 percent of overall program execution are compiled.

Further, while the optimization of byte-coded programs has been described as using either a single compilation level or two compilation levels, the number of compilation levels associated with the execution of byte-coded programs may generally be widely varied without departing from the spirit or the scope of the present invention. In general, the number of compilation levels associated with the execution of a byte-coded program may be dependent on any number of different factors including, but not limited to, the desired level of optimization of the program. Each compilation level may have a separate threshold value, although the threshold values may be the same for substantially all compilation levels. For systems which include a multiple compilation levels, counters that are incremented each time a method is invoked may be placed in each compiled method. These counters, like those placed in interpreted methods, as described above, may be used in the determination of when it may be appropriate to recompile compiled methods.

Although the determination of whether a method is to be compiled has been described as being based upon the threshold value of a counter associated with the method, the determination of whether to compile a method may be based on any number of different factors. By way of example, time "ticks" in an overall operating system may be used to discover time-consuming methods which may benefit from compilation. That is, a method which executes over the course of many time ticks may be considered for compilation in order to reduce the amount of time associated with executing the method.

The execution, or invocation, counters are generally counters which are incremented each time a method is accessed. It should be appreciated that in some embodiments, invocation counters may be decayed over time. For example, if a method was repeatedly invoked at the beginning of program execution, but is not invoked again over a relatively long period of time, the invocation counter may be decayed to reduce the likelihood that the method will be compiled if it is invoked later. Essentially, the invocation counter may Once the invocation counter for a method has been decayed, e.g., exponentially decayed, compiling the method may no longer be advisable. Therefore, the present examples are to be considered as illustrative and not restrictive, and the invention is not to be limited to the details given herein, but may be modified within the scope of the appended claims along with their full scope of equivalents.

What is claimed is:

1. A computer-implemented method for processing a computer program during run-time, the program including byte codes, the byte codes being arranged as a plurality of methods, the computer-implemented method comprising:

invoking a first method selected from the plurality of methods, wherein invoking the first selected method includes interpreting the first selected method;

updating an invocation tracker arranged to track a number of invocations of the first selected method;

determining when the invocation tracker indicates that the number of invocations of the first selected method exceeds a threshold value; and compiling the first selected method when it is determined that the invocation tracker indicates that the number of invocations of the first selected method exceeds the threshold value.

2. A computer-implemented method as recited in claim 1 wherein updating the invocation tracker includes incrementing a counter placed within the first selected method.

3. A computer-implemented method as recited in claim 1 further including:

invoking the compiled first selected method;

updating a tracking mechanism arranged to track a number of invocations of the compiled first selected method;

determining when the tracking mechanism indicates that the number of invocations of the compiled first selected method exceeds a limiting value; and recompiling the compiled first selected method when it is determined that the tracking mechanism indicates that the number of invocations of the compiled first selected method exceeds the limiting value.

4. A computer-implemented method for processing a computer program during run-time, the program including byte codes, the byte codes being arranged as a plurality of methods, the computer-implemented method comprising:

invoking a first method selected from the plurality of methods, wherein invoking the first selected method includes interpreting the first selected method;

updating an invocation tracker arranged to track a number of invocations of the first selected method;

determining when the invocation tracker indicates that the number of invocations of the first selected method exceeds a threshold value;

compiling the first selected method when it is determined that the invocation tracker indicates that the number of invocations of the first selected method exceeds the threshold value; and measuring a compilation overhead associated with compiling the first selected method.

5. A computer-implemented method as recited in claim 4 further including:

determining when the compilation overhead is within an acceptable range; and adjusting the threshold value when it is determined that the compilation overhead is not within the acceptable range.

6. A computer-implemented method as recited in claim 5 wherein adjusting the threshold value includes increasing the threshold value.

7. A computer-implemented method as recited in claim 5 wherein adjusting the threshold value includes decreasing the threshold value.

8. A computer-implemented method as recited in claim 4 wherein measuring the compilation overhead includes calculating a sliding average for the compilation overhead.

9. A computer-implemented method as recited in claim 4 further including measuring an interpretation overhead associated with interpreting the first selected method.

10. A computer-implemented method as recited in claim 9 further including:

determining when the interpretation overhead is within an acceptable range; and adjusting the threshold value when it is determined that the interpretation overhead is not within the acceptable range.

11. A computer-implemented method as recited in claim 9 wherein measuring the interpretation overhead includes calculating a sliding average for the interpretation overhead.

12. A computer-implemented method for executing a computer program, the computer program including a plurality of methods, the plurality of methods including selected methods in different states of optimization, the computer-implemented method comprising:

selecting a first method from the plurality of methods during execution of the computer program, wherein the first method is in a first state of optimization; and transforming the first method from the first state of optimization into a second state of optimization during the execution of the computer program, wherein the second state of optimization is more optimized than the first state of optimization, transforming the first method from the first state of optimization into a second state of optimization including balancing a cost of transforming the first method with a gain of transforming the first method.

13. A computer-implemented method as recited in claim 12 further including executing the first method, wherein executing the first method in the first state of optimization is slower than executing the first method in the second state of optimization.

14. A computer-implemented method as recited in claim 12 wherein the first state of optimization is a state selected from the group consisting of an interpreted state and a compiled state.

15. A computer-implemented method as recited in claim 12 wherein selecting the first method from the plurality of methods includes measuring a number of invocations of the first method during the execution of the computer program.

16. A computer-implemented method for executing a computer program, the computer program including a plurality of methods, the computer-implemented method comprising:

invoking a first method selected from the plurality of methods;

determining when the first selected method is to be processed by a compiler, the determination of when the first selected method is to be processed by the compiler being based on a threshold value associated with the invocation of the first selected method;

processing the first selected method with the compiler when it is determined that the first method is to be processed by the compiler;

adjusting a measure of an overhead associated with the computer program when it is determined that the first method is to be processed by the compiler;

determining whether the measure of the overhead indicates that the overhead is acceptable; and adjusting the threshold value when it is determined that the overhead is not acceptable.

17. A computer-implemented method as recited in claim 16 further including compiling the first selected method prior to invoking the first selected method.

18. A computer-implemented method as recited in claim 17 wherein processing the first selected method with the compiler includes recompiling the first selected method with the compiler.

19. A computer-implemented method as recited in claim 16 wherein processing the first selected method with the compiler includes compiling the first selected method with the compiler.

20. A computer-implemented method as recited in claim 16 wherein determining whether the measure of the overhead indicates that the overhead is acceptable includes determining whether the overhead is within a range of acceptable overhead levels.

21. A computer system for executing byte codes, the byte codes being arranged as a plurality of methods, the computer system comprising:

an interpreter arranged to interpret a first method selected from the plurality of methods;

a first tracking mechanism arranged to count interpretations of the first selected method, the first tracking mechanism further being arranged to determine when the first selected method is suitable for compilation; and a compiler arranged to compile the first selected method when the first selected method is determined to be suitable for compilation.

22. A computer system as recited in claim 21 further including a threshold mechanism arranged to cooperate with the first tracking mechanism to determine when the first selected method is suitable for compilation, wherein the threshold mechanism is arranged to set a threshold value which indicates when the first selected method is suitable for compilation.

23. A computer system as recited in claim 22 wherein the threshold mechanism is further arranged to adjust the threshold value.

24. A computer system as recited in claim 21 further including:

a second tracking mechanism arranged to count invocations of the first selected method when the first selected method is compiled, the second tracking mechanism further being arranged to determined when the first selected method is suitable for recompilation; and a recompiler arranged to recompile the first selected method when the first selected method is determined to be suitable for recompilation.

25. A computer system as recited in claim 21 wherein the tracking mechanism is a counter located within the first selected method, the counter being arranged to be incremented when the first selected method is interpreted.

26. A computer system as recited in claim 25 wherein the counter is located within a loop within the first selected method.

27. A computer program product for processing a computer program, the program including byte codes, the byte codes being arranged as a plurality of methods, the computer program product comprising:

computer code that invokes a first method selected from the plurality of methods, wherein invoking the first selected method includes interpreting the first selected method;

computer code that updates an invocation tracker arranged to track a number of invocations of the first selected method;

computer code that determines when the invocation tracker indicates that the number of invocations of the first selected method exceeds a threshold value; and computer code that compiles the first selected method when it is determined that the invocation tracker indicates that the number of invocations of the first selected method exceeds a threshold value.

28. A computer program product according to claim 27 wherein the computer program product is a data signal embodied in a carrier wave.

29. A computer program product according to claim 27 further including computer code that measures a compilation overhead associated with compiling the first selected method.

30. A computer program product according to claim 29 further including:

computer code that determines when the compilation overhead is within an acceptable range; and computer code that adjusts the threshold value when it is determined that the compilation overhead is not within the acceptable range.

31. A computer program product according to claim 29 further including computer code that measures the compilation overhead includes calculating a sliding average for the compilation overhead.

32. A computer program product according to claim 31 further including computer code that measures an interpretation overhead associated with interpreting the first selected method.

33. A computer program product according to claim 32 further including:

computer code that determines when the interpretation overhead is within an acceptable range; and computer code that adjusts the threshold value when it is determined that the interpretation overhead is not within the acceptable range.

* * * * *